United States Patent
Inada

(10) Patent No.: US 11,459,428 B2
(45) Date of Patent: Oct. 4, 2022

(54) METHOD FOR PRODUCING RUBBER WET MASTERBATCH AND METHOD FOR PRODUCING RUBBER COMPOSITION

(71) Applicant: TOYO TIRE CORPORATION, Itami (JP)

(72) Inventor: Yonosuke Inada, Itami (JP)

(73) Assignee: TOYO TIRE CORPORATION, Itami (JP)

(*) Notice: Subject to any disclaimer, the term of this patent is extended or adjusted under 35 U.S.C. 154(b) by 205 days.

(21) Appl. No.: 16/957,499

(22) PCT Filed: Oct. 12, 2018

(86) PCT No.: PCT/JP2018/038163
§ 371 (c)(1),
(2) Date: Jun. 24, 2020

(87) PCT Pub. No.: WO2019/130727
PCT Pub. Date: Jul. 4, 2019

(65) Prior Publication Data
US 2020/0362122 A1 Nov. 19, 2020

(30) Foreign Application Priority Data
Dec. 26, 2017 (JP) .............................. JP2017-249024

(51) Int. Cl.
| | |
|---|---|
| *C08J 3/22* | (2006.01) |
| *C08K 3/04* | (2006.01) |
| *C08L 7/02* | (2006.01) |
| *C08L 9/04* | (2006.01) |
| *C08L 9/06* | (2006.01) |
| *B60C 1/00* | (2006.01) |

(52) U.S. Cl.
CPC ................ *C08J 3/226* (2013.01); *C08K 3/04* (2013.01); *C08L 7/02* (2013.01); *C08L 9/04* (2013.01); *C08L 9/06* (2013.01); *B60C 1/00* (2013.01); *C08K 2201/006* (2013.01)

(58) Field of Classification Search
CPC ...... C08J 3/226; C08K 3/04; C08K 2201/006; C08L 7/02; C08L 9/04
See application file for complete search history.

(56) References Cited

U.S. PATENT DOCUMENTS

| | | | |
|---|---|---|---|
| 6,391,274 | B1 | 5/2002 | Vogler et al. |
| 2011/0021664 | A1 | 1/2011 | Wang et al. |
| 2012/0083571 | A1 | 4/2012 | Hasegawa |
| 2017/0073477 | A1 | 3/2017 | Nishiura et al. |

FOREIGN PATENT DOCUMENTS

| | | | |
|---|---|---|---|
| JP | 2002-524602 A | | 8/2002 |
| JP | 2012-77133 A | | 4/2012 |
| JP | 2012-193307 A | | 10/2012 |
| JP | 2013-505324 A | | 2/2013 |
| JP | 2013-505326 A | | 2/2013 |
| JP | 2013-139580 A | | 7/2013 |
| JP | 2015-214625 A | | 12/2015 |
| JP | 2016-37547 A | | 3/2016 |
| WO | 2011/034585 A2 | | 3/2011 |
| WO | 2011/034589 A2 | | 3/2011 |

OTHER PUBLICATIONS

Notification of Transmillal of Translation of the International Preliminary Report on Patentabililty (Form PCT/IB/338) issued in counterpart International Application No. PCT/JP2018/038163 dated Jul. 9, 2020 with Forms PCT/IB/373 and PCT/ISA/237. (7 pages).
Office Action dated Feb. 12, 2021, issued in counterpart JP Application No. 2019-562772, with English translation. (6 pages).
International Search Report dated Dec. 4, 2018, issued in counterpart International Application No. PCT/JP2018/038163. (2 pages).

*Primary Examiner* — Edward J Cain
(74) *Attorney, Agent, or Firm* — WHDA, LLP

(57) ABSTRACT

A method for producing a rubber wet master batch is disclosed including: producing a carbon black-containing rubber latex solution by mixing carbon black, a dispersion solvent and a rubber latex solution; producing a carbon black-containing rubber coagulum by coagulating the thus-obtained carbon black-containing rubber latex solution; and producing a rubber wet master batch by dehydrating and drying the thus-obtained carbon black-containing rubber coagulum. With respect to this method for producing a rubber wet master batch, the carbon black satisfies conditions such that: the DBP oil absorption is 105-230 mL/100 g; STSA is 90-205 $m^2/g$; and the value obtained by subtracting the value of STSA from the value of DBP oil absorption is 15 or more. This method for producing a rubber wet master batch enables the achievement of a vulcanized rubber that has wear resistance and low heat generation properties.

4 Claims, 1 Drawing Sheet

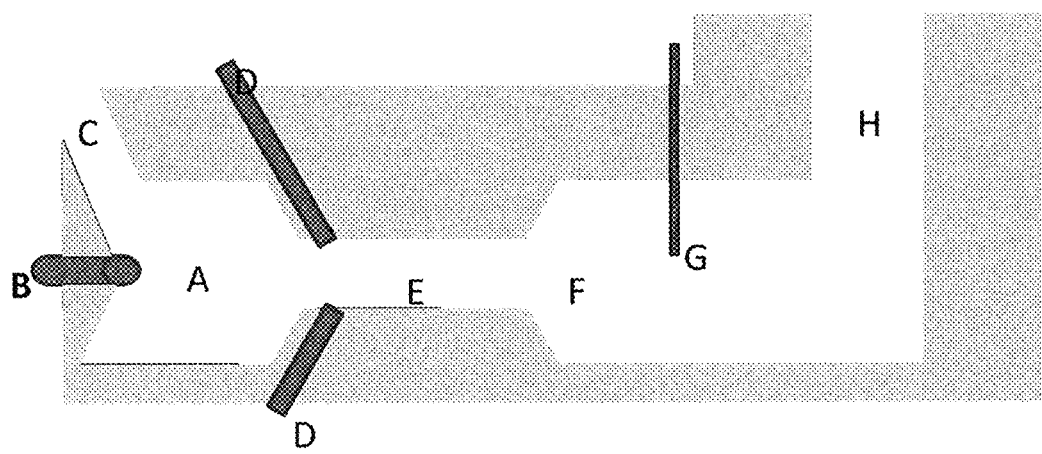

METHOD FOR PRODUCING RUBBER WET MASTERBATCH AND METHOD FOR PRODUCING RUBBER COMPOSITION

TECHNICAL FIELD

The present invention relates to a method for producing a rubber wet masterbatch and a method for producing a rubber composition.

BACKGROUND ART

Hitherto, there have been known rubber compositions using rubber masterbatches (Patent Documents 1 to 4) containing carbon black having a specific dibutyl phthalate oil absorption (hereinafter, also referred to as DBP oil absorption) and a statistical thickness specific surface area (hereinafter, also referred to as STSA).

In the rubber masterbatches, there has been known use of a rubber wet masterbatch in order to improve processability during production of a rubber composition containing carbon black and the dispersibility of the carbon black. This technique is a technique of mixing carbon black with a dispersing solvent beforehand at a predetermined ratio, dispersing the carbon black in the dispersing solvent by a mechanical force, mixing the carbon black-containing slurry solution with a rubber latex solution in a liquid phase, adding a coagulant such as an acid to the mixture to coagulate the mixture, collecting the coagulated mixture (carbon black-containing rubber coagulated product), and then drying the mixture.

The use of a rubber wet masterbatch provides a rubber composition having excellent dispersibility of carbon black and excellent rubber physical properties such as workability and reinforceability, than the use of a rubber dry masterbatch yielded by mixing carbon black with a rubber in a solid phase. The use of such a rubber composition as a raw material makes it possible to produce a rubber product (vulcanized rubber) such as a pneumatic tire having decreased rolling resistance and excellent fatigue resistance.

PRIOR ART DOCUMENTS

Patent Documents

Patent Document 1: JP-A-2016-37547
Patent Document 2: JP-A-2013-139580
Patent Document 3: JP-T-2013-505326
Patent Document 4: JP-T-2013-505324

SUMMARY OF THE INVENTION

Problems to be Solved by the Invention

Meanwhile, the market requires a tire (vulcanized rubber) using a rubber composition as a raw material and having lower exothermicity and abrasion resistance. However, vulcanized rubbers yielded, respectively, from rubber compositions disclosed in Patent Documents have room for improvement in the properties.

In the light of the above-mentioned actual situation, the present invention has been made. An object thereof is to provide a method for producing a rubber wet masterbatch from which a vulcanized rubber having low exothermicity and abrasion resistance can be yielded.

Means for Solving the Problems

The present invention relates to a method for producing a rubber wet masterbatch which is yielded using at least carbon black, a dispersing solvent, and a rubber latex solution as raw materials, the method including: a step (I) of producing a carbon black-containing rubber latex solution by mixing the carbon black, the dispersing solvent, and the rubber latex solution; a step (II) of producing a carbon black-containing rubber coagulated product by coagulating the resultant carbon black-containing rubber latex solution; and a step (III) of producing a rubber wet masterbatch by dehydrating and drying the resultant carbon black-containing rubber coagulated product, wherein the carbon black satisfies conditions in which: a dibutyl phthalate oil absorption is 105 mL/100 g or more and 230 mL/100 g or less; a statistical thickness specific surface area is 90 $m^2$/g or more and 205 m/g or less; and a value obtained by subtracting a value of the statistical thickness specific surface area from a value of the dibutyl phthalate oil absorption is 15 or more.

The present invention relates to a method for producing a rubber composition, including a step (IV) of using the rubber wet masterbatch yielded by the method to attain dry-mixing.

Effect of the Invention

About an action mechanism of advantageous effects in a method for producing a rubber wet masterbatch according to the present invention, details thereof are partially unclear. However, the mechanism is presumed as described below. However, the present invention may not be interpreted with limitation to this action mechanism.

Usually, carbon black has a larger structure as a value of the dibutyl phthalate oil absorption (DBP oil absorption) is larger, so that a vulcanized rubber using a rubber masterbatch containing the carbon black has improved abrasion resistance, but the vulcanized rubber tends to have deteriorated exothermicity. The carbon black has a smaller particle size as a value of the statistical thickness specific surface area (STSA) is larger, so that a vulcanized rubber using a rubber masterbatch containing the carbon black tends to have deteriorated exothermicity.

Meanwhile, in the method for producing a rubber wet masterbatch of the present invention, the rubber wet masterbatch contains, as a raw material, the carbon black satisfying conditions in which: a dibutyl phthalate oil absorption (DBP oil absorption) is 105 mL/100 g or more and 230 mL/100 g or less; a statistical thickness specific surface area (STSA) is 90 $m^2$/g or more and 205 $m^2$/g or less; and a value obtained by subtracting a value of the STSA from a value of the DBP oil absorption is 15 or more. Thus, the use of carbon black having a specific DBP oil absorption and a specific STSA (that is, carbon black having a specific structure and a specific particle size) as a raw material for a rubber wet masterbatch is presumed to provide a rubber composition having low exothermicity and abrasion resistance. In particular, in the present invention, the value obtained by subtracting the value of the STSA from the value of the DBP oil absorption is equal to or greater than a specific value. This is presumed to provide an improved balance between the structure size and particle size of the carbon black, to provide a rubber composition having an excellent balance between low exothermicity and abrasion resistance.

BRIEF DESCRIPTION OF THE DRAWING

FIG. 1 is a schematic sectional view showing a configuration example of a reactor used for producing carbon black of the present invention.

MODE FOR CARRYING OUT THE INVENTION

A method for producing a rubber wet masterbatch of the present invention uses at least carbon black, a dispersing solvent, and a rubber latex solution as raw materials.

<Carbon Black>

The carbon black of the present invention contains carbon black satisfying conditions in which: a dibutyl phthalate oil absorption is 105 mL/100 g or more and 230 mL/100 g or less; a statistical thickness specific surface area is 90 m$^2$/g or more and 205 m$^2$/g or less; and a value obtained by subtracting a value of the statistical thickness specific surface area from a value of the dibutyl phthalate oil absorption is 15 or more.

The carbon black has a dibutyl phthalate oil absorption of 105 mL/100 g or more and 230 mL/100 g or less. From the viewpoint of improving the low exothermicity and abrasion resistance of a vulcanized rubber, the carbon black has a dibutyl phthalate oil absorption of preferably 107 mL/100 g or more, more preferably 115 mL/100 g or more, and still more preferably 120 mL/100 g or more. The carbon black has a dibutyl phthalate oil absorption of preferably 190 mL/100 g or less, more preferably 170 mL/100 a or less, and still more preferably 150 mL/100 g or less. The dibutyl phthalate oil absorption can be measured according to JIS K 6217-4: 2008.

The carbon black has a statistical thickness specific surface area of 90 m$^2$/g or more and 205 m$^2$/g or less. From the viewpoint of improving the low exothermicity and abrasion resistance of the vulcanized rubber, the carbon black has a statistical thickness specific surface area of preferably 91 m$^2$/g or more, more preferably 95 m$^2$/g or more, and still more preferably 98 m$^2$/g or more. The carbon black has a statistical thickness specific surface area of preferably 150 m$^2$/g or less, more preferably 130 m$^2$/g or less, and still more preferably 115 m$^2$/g or less. The statistical thickness specific surface area can be measured according to JIS K 6217-7: 2013.

In the carbon black, the value obtained by subtracting the value of the statistical thickness specific surface area from the value of the dibutyl phthalate oil absorption is 15 or more. From the viewpoint of improving the balance between the low exothermicity and abrasion resistance of the vulcanized rubber, the value obtained by subtracting the value of the statistical thickness specific surface area from the value of the dibutyl phthalate oil absorption is preferably 20 or more, more preferably 25 or more, and still more preferably 35 or more. Examples of the upper limit value of the value obtained by subtracting the value of the statistical thickness specific surface area from the value of the dibutyl phthalate oil absorption include 140 or less, and 100 or less.

The amount of the carbon black is preferably 20 to 60 parts by weight based on 100 parts by weight of the rubber component in the rubber wet masterbatch. From the viewpoint of improving the low exothermicity and abrasion resistance of the vulcanized rubber, the amount of the carbon black is preferably 30 parts by weight or more, and more preferably 40 parts by weight or more, based on 100 parts by weight of the rubber component in the rubber wet masterbatch. The amount of the carbon black is preferably 55 parts by weight or less, and more preferably 50 parts by weight or less.

<Dispersing Solvent>

The dispersing solvent of the present invention to be used is particularly preferably water, and may be, for example, water containing an organic solvent. The dispersing solvents may be used singly or in any combination of two or more thereof.

<Rubber Latex Solution>

As the rubber latex solution of the present invention, a natural rubber latex solution and a synthetic rubber latex solution can be used.

The natural rubber latex solution is a natural product based on the metabolic effect of plants, and is preferably a natural rubber/water-based latex solution in which a dispersing solvent is, particularly, water. The number-average molecular weight of the natural rubber contained in the natural rubber latex is preferably 2000000 or more, and more preferably 2500000 or more. As the natural rubber latex solution, concentrated latex and fresh latex called field latex can be used without being distinguished from each other. Examples of the synthetic rubber latex solution include those produced by subjecting styrene-butadiene rubber, butadiene rubber, nitrile rubber, and chloroprene rubber to emulsion polymerization. The rubber latex solutions may be used singly or in any combination of two or more thereof.

<Method for Producing Carbon Black>

In the method for producing carbon black, a reactor is used, which includes a fuel combustion zone, a raw hydrocarbon introduction zone, and a reaction zone provided in this order in the downstream direction from the upstream side of a gas passage. The method includes causing an oxygen-containing gas and fuel to flow into the fuel combustion zone, mixing and combusting the oxygen-containing gas and the fuel to generate a high-temperature combusted gas, then introducing the high-temperature combusted gas and a raw hydrocarbon into the raw hydrocarbon introduction zone to generate a carbon black-containing gas, and thereafter terminating the reaction using a coolant or the like. Examples of the reactor include a large-diameter cylindrical reactor as schematically shown in FIG. 1. For example, methods for producing carbon black, disclosed in JP-A-2017-145359 and JP-A-2011-162596 and the like, can be referred. Hereinafter, the method for producing carbon black will be described appropriately taking the reactor shown in FIG. 1 as an example.

The reactor shown in FIG. 1 includes a fuel combustion zone A, a raw hydrocarbon introduction zone E, and a reaction zone F which communicate with each other and are provided in this order in the downstream direction from the upstream side of a gas passage formed inside the reactor.

In the reactor shown in FIG. 1, the fuel combustion zone A includes an oxygen-containing gas inlet C through which an oxygen-containing gas such as air is introduced in the axial direction of the reactor, and a combustion burner B which feeds fuel in the axial direction of the reactor. The raw hydrocarbon introduction zone E includes a raw material introduction nozzle D which feeds a raw hydrocarbon in the axial direction of the reactor, and is provided to coaxially communicate with the fuel combustion zone A. A reaction termination zone is also provided to coaxially communicate with the reaction zone F. The reaction termination zone includes a coolant introduction nozzle G which sprays a coolant in the axial direction of the reactor.

In the fuel combustion zone A, an oxygen-containing gas and fuel are introduced, and mixed and combusted to generate a high-temperature combusted gas stream. Examples of the oxygen-containing gas include gas which contains oxygen, air, or a mixture thereof. Examples of the fuel include hydrogen, carbon monoxide, natural gas, oil gas, petroleum-derived liquid fuel such as FCC residual oil and heavy oil, and coal-derived liquid fuel such as creosote oil.

In the fuel combustion zone A, the amount of the oxygen-containing gas fed is preferably about 1500 kg/h to 3000 kg/h, more preferably about 1600 kg/h to 2000 kg/h, and still more preferably about 1700 kg/h to 1900 kg/h. In the fuel combustion zone A, the amount of the fuel fed is preferably about 50 kg/h to 400 kg/h, more preferably about 100 kg/h to 300 kg/h, and more preferably about 150 kg/h to 200 kg/h. For example, by feeding the fuel while feeding the oxygen-containing gas preheated to about 500° C. to 800° C. (preferably, about 600° C. to 700° C.), both the oxygen-containing gas and the fuel may be mixed and combusted in the fuel combustion zone A, to generate the high-temperature combusted gas stream.

The method for producing carbon black includes introducing the raw hydrocarbon into the raw hydrocarbon introduction zone E from the raw material introduction nozzle D while introducing the high-temperature combusted gas stream into the raw hydrocarbon introduction zone E.

Examples of the raw hydrocarbon include aromatic hydrocarbons such as benzene, toluene, xylene, naphthalene, and anthracene; coal-derived hydrocarbons such as creosote oil and carboxylic acid oil; petroleum-derived heavy oils such as ethylene heavy end oil and FCC residual oil; acetylene-based unsaturated hydrocarbons, ethylene-based hydrocarbons, and aliphatic saturated hydrocarbons such as pentane and hexane. Examples of the raw material introduction nozzle D include a one-fluid nozzle.

The amount of the raw hydrocarbon introduced is preferably about 50 kg/h to 1000 kg/h, more preferably about 100 kg/h to 500 kg/h, and still more preferably about 250 kg/h to 380 kg/h.

In the method for producing carbon black, carbon black particles (carbon black-containing gas) generated in the reaction zone F and suspended in a high-temperature combusted gas are introduced into the reaction termination zone, where the coolant is sprayed to the carbon black particles. Examples of the coolant include water. The carbon black-containing gas is cooled by spraying the coolant. The spraying of the coolant can be performed, for example, by spraying the coolant from the coolant introduction nozzle G shown in FIG. 1.

Elapse time from the initial contact of the high-temperature combusted gas stream and the raw hydrocarbon to the cooling of the high-temperature combusted gas stream and the raw hydrocarbon by the coolant introduction nozzle G in the reaction termination zone (hereinafter, also referred to as residence time) is preferably about 0.001 sec to 0.01 sec, and more preferably about 0.002 sec to 0.005 sec.

An average temperature during the time for reaching from the reaction zone F to the coolant introduction nozzle G (hereinafter, also referred to as reaction temperature) is preferably about 1200° C. to 2000° C., more preferably about 1400° C. to 1900° C., and still more preferably about 1500° C. to 1700° C.

An average temperature during the time for reaching from the raw hydrocarbon introduction zone E to the reaction zone F (hereinafter also referred to as "retention temperature") is preferably about 1000° C. to 1800° C., more preferably about 1100° C. to 1600° C., and still more preferably about 1200° C. to 1300° C.

The carbon black particles cooled by the coolant can be separated and collected using a collecting system (separating/collecting device) such as a cyclone or a bag filter through a flue H and the like to collect the target carbon black.

<Method for Producing Rubber Wet Masterbatch>

Hereinafter, the method for producing a rubber wet masterbatch of the present invention will be specifically described. The method includes: a step (I) of producing a carbon black-containing rubber latex solution by mixing the carbon black, the dispersing solvent, and the rubber latex solution; a step (II) of producing a carbon black-containing rubber coagulated product by coagulating the resultant carbon black-containing rubber latex solution; and a step (III) of producing a rubber wet masterbatch by drying the resultant carbon black-containing rubber coagulated product.

<Step (I)>

In the step (I) of the present invention, a carbon black-containing rubber latex solution is produced by mixing the carbon black, the dispersing solvent, and the rubber latex solution. In particular, in the present invention, the step (I) preferably includes a step (I-a1) of dispersing the carbon black in the dispersing solvent to produce a carbon black-containing slurry solution (hereinafter, also referred to as slurry solution) and a step (I-b1) of mixing the resultant carbon black-containing slurry solution with the rubber latex solution to produce a carbon black-containing rubber latex solution. In the present invention, the step (I) more preferably includes a step (I-a2) of producing a slurry solution containing carbon black to which rubber latex particles adhere by adding at least a part of the rubber latex solution to the dispersing solvent when dispersing the carbon black in the dispersing solvent, and a step (I-b2) of producing a rubber latex solution containing carbon black to which rubber latex particles adhere by mixing the resultant slurry solution containing carbon black to which rubber latex particles adhere with a rest of the rubber latex solution.

<Step (I-a1)>

In the step (I-a1), the method for mixing the carbon black with the dispersing solvent include a method for dispersing the carbon black, using an ordinary dispersing machine such as a highly shearing mixer, a high shear mixer, a homo-mixer, a ball mill, a bead mill, a high-pressure homogenizer, an ultrasonic homogenizer, or a colloid mill.

The "highly shearing mixer" means a mixer including a high-speed-rotatable rotor and a fixed stator in which in a state of setting a precise clearance between the rotor and the stator, the rotor is rotated so that a highly shearing effect acts. In order to produce such a highly shearing effect, it is preferred to set the clearance between the rotor and the stator to 0.8 mm or less, and set the circumferential speed of the rotor to 5 m/s or more. Such a highly shearing mixer to be used may be a commercially available product. Examples thereof include "High Shear Mixer" manufactured by SILVERSON.

<Step (I-a2)>

In the step (I-a2), when the carbon black is dispersed in the dispersing solvent, at least a part of the rubber latex solution is added to the dispersing solvent to produce a slurry solution containing carbon black to which rubber latex particles adhere. It is allowable to mix the rubber latex solution with the dispersing solvent in advance, and then add the carbon black to the mixture to disperse the carbon black in the mixture. It is also allowable to: add the carbon black to the dispersing solvent; and then disperse the carbon black in the dispersing solvent while adding the rubber latex solution thereto at a predetermined adding-speed. Alternatively, it is allowable to: add the carbon black into the dispersing solvent; and then disperse the carbon black in the dispersing solvent while adding thereto a predetermined volume of the rubber latex solution several times through operations separated from each other. By dispersing the carbon black in the dispersing solvent in the presence of the rubber latex solution, the slurry solution containing carbon black to which rubber latex particles adhere can be produced. The addition amount of the rubber latex solution in the step (I-a2) is, for example, 0.075 to 12% by weight based on the whole amount of the rubber latex solution to be used (the whole amount of the latex solution which is added in the step (I-a2) and in the step (I-b2).

In the step (I-a2), the amount of the rubber solid content in the rubber latex solution to be added is preferably 0.25 to 15% by weight, and more preferably 0.5 to 6% by weight with respect to the carbon black. The concentration of the rubber solid content in the rubber latex solution to be added is preferably 0.2 to 5% by weight, and more preferably 0.5 to 1.5% by weight. In these cases, a rubber wet masterbatch can be produced, in which the dispersion degree of the carbon black is heightened while the rubber latex particles are surely caused to adhere to the carbon black.

In the step (I-a2), examples of the method for mixing the carbon black with the dispersing solvent in the presence of the rubber latex solution include the same method as the method for mixing carbon black with a dispersing solvent.

<Step (I-b1)>

In the step (I-b1) of the present invention, the slurry solution is mixed with the rubber latex solution to produce a carbon black-containing rubber latex solution. The method for mixing the slurry solution with the rubber latex solution in a liquid phase is not particularly limited, and examples thereof include a method for mixing the slurry solution with the rubber latex solution using an ordinary dispersing machine or a mixing machine in which a blade is rotated in a cylindrical vessel such as a highly shearing mixer, a High Shear Mixer, a homo-mixer, a ball mill, a bead mill, a high-pressure homogenizer, an ultrasonic homogenizer, or a colloid mill. If necessary, the whole of the mixing system, for example, the disperser may be heated during the mixing.

When the dehydrating time and labor in the step (III) to be described later are considered, specifically, the rubber latex solution preferably has a rubber solid content concentration of 10 to 60% by weight, and more preferably 20 to 30% by weight.

<Step (I-b2)>

In the step (I-b2), the slurry solution containing carbon black to which rubber latex particles adhere is mixed with the rest of the rubber latex solution to produce a rubber latex solution containing carbon black to which rubber latex particles adhere. Examples of the method for mixing the slurry solution containing carbon black to which rubber latex particles adhere with the rest of the rubber latex solution in a liquid phase include the same method as the method for mixing the slurry solution with the rubber latex solution in a liquid phase.

When the dehydrating time and labor in the step (iii) to be described later are considered, the rest of the rubber latex solution preferably has a higher rubber solid content concentration than that of the rubber latex solution added in the step (I-a2). Specifically, the rubber solid concentration is preferably 10 to 60% by weight, and more preferably 20 to 3.0% by weight.

In the step (I), a surfactant may be added to improve the dispersibility of the carbon black. The surfactant to be used may be a surfactant known in the rubber industry. Examples thereof include nonionic surfactants, anionic surfactants, cationic surfactants, and amphoteric surfactants. Instead of the surfactant or in addition of the surfactant, an alcohol such as ethanol may be used. However, when the surfactant is used, it is feared that the rubber physical properties of the finally obtained vulcanized rubber are lowered. Thus, the blending amount of the surfactant is preferably 2 parts by weight or less, and more preferably 1 part by weight or less, based on 100 parts by weight of the rubber solid content amount in the rubber latex solution. It is preferred not to use the surfactant substantially.

<Step (II)>

In the step (II) of the present invention, the resultant carbon black-containing rubber latex solution is coagulated to produce a carbon black-containing rubber coagulated product.

Examples of the coagulation method include a method for incorporating a coagulant into the carbon black-containing rubber latex solution. As the coagulant, acids such as formic acid and sulfuric acid; and salts such as sodium chloride, which are usually used to coagulate a rubber latex solution, can be used.

<Step (III)>

In the step (III) of the present invention, the carbon black-containing rubber coagulated product yielded above is dehydrated and dried to produce a rubber wet masterbatch. As the dehydrating/drying method, for example, various drying apparatuses such as a uniaxial extruder, a biaxial extruder, a screw press, an oven, a conveyer drier, a vacuum drier, and an air drier can be used. Before the step (III), if necessary, for example, a centrifugal separation step, or a solid/liquid-separating step using a vibrating screen may be provided for the purpose of appropriately decreasing the water amount contained in the carbon black-containing rubber coagulated product. Alternatively, a washing step such as a water washing method may be provided for the purpose of washing.

<Step (IV)>

The method for producing a rubber composition of the present invention includes a step (IV) of using the rubber wet masterbatch yielded by the method for producing a rubber wet masterbatch to attain dry-mixing.

In the step (IV), various blending agents can be further used. Examples of the usable blending agents include blending agents used ordinarily in the rubber industry such as rubbers, sulfur-based vulcanizers, vulcanization promoters, antiaging agents, silica, silane coupling agents, zinc oxide, methylene acceptors and methylene donors, stearic acid, vulcanization promotion aids, vulcanization retarders, organic peroxides, softeners such as wax and oil, and working aids.

The rubbers are used separately from the rubber component derived from the rubber wet masterbatch. Examples of the rubbers include natural rubber (NR); and synthetic diene rubbers such as isoprene rubber (IR), styrene-butadiene rubber (SBR), butadiene rubber (BR), chloroprene rubber (CR), and nitrile rubber (NBR). The rubbers may be used singly or in any combination of two or more thereof.

The content of the carbon black is preferably 20 to 60 parts by weight based on 100 parts by weight of the rubber component in the rubber composition. From the viewpoint of improving the low exothermicity and abrasion resistance of the vulcanized rubber, the amount of the carbon black is preferably 30 parts by weight or more, and more preferably 40 parts by weight or more by weight based on 100 parts by weight of the rubber component in the rubber composition. The amount of the carbon black is preferably 55 parts by weight or less, and more preferably 50 parts by weight or less.

Sulfur for the sulfur-based vulcanizers may be any ordinary sulfur for rubbers. Usable examples thereof include powdery sulfur, precipitated sulfur, insoluble sulfur, and highly dispersible sulfur. The sulfur-based vulcanizers may be used singly or in any combination of two or more thereof.

The content of the sulfur is preferably 0.3 to 6.5 parts by weight based on 100 parts by weight of the rubber component in the rubber composition. If the content of the sulfur is less than 0.3 parts by weight, the vulcanized rubber has an insufficient crosslinkage density to cause a decreased rubber strength and the like. If the content is more than 6.5 parts by weight, the vulcanized rubber particularly has both deteriorated heat resistance and endurance. The content of the sulfur is more preferably 1.0 to 5.5 parts by weight based on 100 parts by weight of the rubber component in the rubber composition to cause the vulcanized rubber to keep a good rubber strength and have further improved heat resistance and endurance.

The vulcanization promoter may be any ordinary vulcanization promoter for rubbers. Examples thereof include sulfenamide based, thiuram based, thiazole based, thiourea based, guanidine based, and dithiocarbamic acid salt based vulcanization promoters. The vulcanization promoters may be used singly or in any combination of two or more thereof.

The content of the vulcanization promoter is preferably 1 to 5 parts by weight based on 100 parts by weight of the rubber component in the rubber composition.

The antiaging agent may be any ordinary antiaging agent for rubbers. Examples thereof include aromatic amine based, amine-ketone based, monophenol based, bisphenol based, polyphenol based, dithiocarbamic acid salt based, and thiourea based antiaging agents. The antiaging agents may be used singly or in any combination of two or more thereof.

The content of the antiaging agent is preferably 1 to 5 parts by weight based on 100 parts by weight of the rubber component in the rubber composition.

accordance with the size of a kneading machine to be used, and the like. It is advisable to usually set the time to about 2 to 5 minutes. The discharging temperature in the kneading machine is preferably 12.0 to 170° C., and more preferably 120 to 150° C. When the rubber composition contains the vulcanization related components, the discharging temperature in the kneading machine is preferably 80 to 110° C., and more preferably 80 to 100° C.

The method for producing a rubber wet masterbatch of the present invention or the method for producing a rubber composition thereof makes it possible to provide a vulcanized rubber having low exothermicity and abrasion resistance. The rubber wet masterbatch and the rubber composition of the present invention are suitable for pneumatic tires.

EXAMPLES

Hereinafter, the present invention will be described with reference to Examples, but the present invention is not limited to these Examples.

Synthesis Examples

<Production of Carbon Blacks 1 and 2>

Carbon blacks 1 and 2 are synthesized under production conditions described in Table 1 using the above-described wide-diameter cylindrical reactor.

Comparative Synthesis Examples

<Production of Carbon Blacks A to F>

Carbon blacks A to F are synthesized under production conditions described in Table 1 using the above-described wide-diameter cylindrical reactor.

TABLE 1

|  | Carbon black | | | | | | | |
| --- | --- | --- | --- | --- | --- | --- | --- | --- |
|  | 1 | 2 | A | B | C | D | E | F |
| Amount of raw hydrocarbon introduced (kg/h) | 325 | 325 | 324 | 380 | 400 | 130 | 155 | 332 |
| Amount of oxygen-containing gas fed (kg/h) | 820 | 1811 | 1775 | 1693 | 1806 | 4300 | 1718 | 1647 |
| Amount of fuel fed (kg/h) | 172 | 174 | 180 | 185 | 188 | 184 | 180 | 175 |
| Temperature of oxygen-containing gas (° C.) | 652 | 665 | 605 | 651 | 650 | 655 | 658 | 664 |
| Residence time (sec) | 0.0031 | 0.0021 | 0.0035 | 0.0030 | 0.0029 | 0.0028 | 0.0027 | 0.0024 |
| Reaction temperature (° C.) | 1600 | 1625 | 1500 | 1610 | 1613 | 1613 | 1621 | 1625 |
| Pesidence temperature (° C.) | 1205 | 2245 | 1250 | 1220 | 1220 | 1230 | 1235 | 1240 |

In the step (IV), examples of the method for blending (or adding) the rubber wet masterbatch, and the various blending agents include a method for kneading these components using a kneading machine used in an ordinary rubber industry such as a Banbury mixer, a kneader, or a roll.

The kneading method is not particularly limited, and examples thereof include a method for adding components other than vulcanization-related components such as a sulfur-based vulcanizer and a vulcanization promoter, to each other in any order, and kneading the components, a method for simultaneously adding the components to each other, and kneading the components, or a method for simultaneously adding all the components to each other, and kneading the components. The number of times of the kneading may be one or plural. The time for the kneading is varied in <Characteristic Analysis of Carbon Black>

<Evaluation of Dibutyl Phthalate Oil Absorption (DBP Oil Absorption)>

The dibutyl phthalate oil absorption was determined according to JIS K 6217-4: 2008 for the above carbon blacks obtained in Synthesis Examples and Comparative Synthesis Examples. The results are shown in Table 2.

<Evaluation of Statistical Thickness Specific Surface Area (STSA)>

The dibutyl phthalate oil absorption was determined according to JIS K 6217-7: 2013 for the above carbon blacks obtained in Synthesis Examples and Comparative Synthesis Examples. The results are shown in Table 2.

TABLE 2

| | Carbon black | | | | | | | |
|---|---|---|---|---|---|---|---|---|
| | 1 | 2 | A | B | C | D | E | F |
| DBP (mL/100 g) | 139 | 136 | 125 | 117 | 130 | 130 | 119 | 110 |
| STSA (m$^2$/g) | 100 | 98 | 121 | 86 | 65 | 210 | 116 | 102 |
| DBP-STSA | 39 | 38 | 4 | 31 | 65 | −80 | 3 | 8 |

In Table 2, carbon black A indicates "SEAST 7HM (N234)" manufactured by Tokai Carbon Co., Ltd.; and carbon black B indicates "SEAIST KH (N339)" manufactured by Tokai Carbon Co., Ltd.

(Used Raw Materials Other Than Carbon Black)

a) Natural rubber latex solution: "NR field latex" (manufactured by Golden Hope) (DRC=31.2%)

b) Natural rubber: "RSS #3"

c) Zinc oxide: "Zinc oxide No. 1" (manufactured by Mitsui Mining & Smelting Co., Ltd.)

a) Stearic acid: "RUNACK S20" (manufactured by Kao Corporation)

e) Antiaging agent (A): N-phenyl-N'-(1,3-dimethylbutyl)-p-phenylenediamine, "NOCRAC 6C" (manufactured by Ouchi Shinko Chemical Industrial Co., Ltd.)

f) Antiaging agent (B): p-(p-toluenesulfonylamide)diphenylamine, "NOCRAC 224." (manufactured by Ouchi Shinko Chemical Industrial Co., Ltd.)

g) Sulfur: "5%-oil-incorporated finely powdery sulfur" (manufactured by Tsurumi Chemical Industry Co., Ltd.)

h) Vulcanization promoter (A): N-cyclohexyl-2-benzothiazole sulfenamide: "SUNCELLER CM-G" (manufactured by Sanshin Chemical Industry Co., Ltd.)

i) Vulcanization promoter (B): 1,3-diphenylguanidine, "NOCCELER D" (manufactured by Ouchi Shinko Chemical Industrial Co., Ltd.)

Examples 1, 3, and 4

<Step (I): Production of Carbon Black-Containing Rubber Latex Solution>

Water was added to a natural rubber latex solution to prepare a rubber dilute latex aqueous solution having an adjusted concentration of 0.5% by weight. To the resultant rubber dilute latex aqueous solution, 45 parts by weight of the carbon black 1 (the solid content of the latex solution (rubber amount) was 1 part by weight with respect to the carbon black) was added. ROBOMIX manufactured by PRIMIX Corp. was used (ROBOMIX conditions: 9000 rpm for 30 minutes) to disperse the carbon black in the solution, thereby producing a slurry solution containing carbon black to which rubber latex particles adhere (step (I-a2)). Next, to the slurry solution containing carbon black to which rubber latex particles adhere, and produced in the step (I-a2), the rest of the rubber latex solution (25% by weight) and the rubber dilute latex aqueous solution used in the step (I-a2) were added to set the solid content (rubber) amount to 100 parts by weight. Thereafter, a mixer for home use, SM-L56 model manufactured by SANYO Electric Co., Ltd. was used to mix the individual components with each other (mixer conditions: 11300 rpm for 30 minutes) to produce a rubber latex solution containing carbon black to which rubber latex particles adhere (step (I-b2)).

<Step (II): Production of Carbon Black-Containing Rubber Coagulated Product>

Formic acid (10% solution) as a coagulant was added into the rubber latex solution containing carbon black to which rubber latex particles adhere. The rubber latex solution containing carbon black was produced in the step (I) until the pH of the whole of the solution reached 4. In this way, a carbon black-containing rubber coagulated product was produced (step (II)).

<Step (III): Production of Rubber Wet Masterbatch>

A squeezer type uniaxial extruding/dehydrating machine (V-02 type manufactured by Suehiro EPM Corp.) was used to dehydrate and dry the carbon black-containing rubber coagulated product produced in the step (II) until the moisture percentage therein was reduced to 1.5% or less. In this way, a rubber wet masterbatch was produced (step (III)).

<Step (IV): Production of Rubber Composition and Unvulcanized Rubber Composition>

A Banbury mixer was used to dry-mix the rubber wet masterbatch yielded above with individual raw materials (components other than any sulfur and any vulcanization promoter) described in Table 3 (kneading time: 3 minutes; discharging temperature: 150° C.). In this way, a rubber composition was produced. Next, to the resultant rubber composition, sulfur and vulcanization promoters (A) and (B) described in Table 3 were added, and the Banbury mixer was then used to dry-mix all the components (kneading time: 1 minute; discharging temperature: 90° C.). In this way, an unvulcanized rubber composition was produced. The blending proportion of any component in Table 3 is represented by the numerical value (phr) of the part(s) by weight of the component when the whole amount of the rubber component contained in the rubber composition is regarded as 100 parts by weight.

Example 2

A rubber wet masterbatch, a rubber composition, and an unvulcanized rubber composition of Example 2 were produced in the same manner as in Example 1 except that carbon black to be used was changed to a type shown in Table 3 in <Step (I): Production of Carbon Black-Containing Rubber Latex Solution> in Example 1.

Comparative Examples 1 to 8

A Banbury mixer was used. to dry-mix respective raw materials described in Table 3 (components excluding any sulfur and any vulcanization promoter) (kneading time: 3 minutes, discharging temperature: 150° C.) to produce rubber compositions of Comparative Examples 1 to 8. Next, sulfur, a vulcanization promoter (A), and a vulcanization promoter (B) described in Table 3 were added to the resultant rubber composition, followed by dry-mixing using a Banbury mixer (kneading time: 1 minute, discharging temperature: 90° C.), thereby producing unvulcanized rubber compositions of Comparative Examples 1 to 8. The blending proportion of any component in Table 3 is represented by the numerical value (phr) of the part(s) by weight of the component when the whole amount of the rubber component contained in the rubber composition is regarded as 100 parts by weight.

Comparative Examples 9 to 16

A rubber wet masterbatch, a rubber composition, and an unvulcanized rubber composition of each of Comparative Examples 9 to 16 were produced in the same manner as in Example 1 except that carbon black to be used was changed to a type shown in Table 3 in <Step (I): Production of Carbon Black-Containing Rubber Latex Solution> in Example 1.

The unvulcanized rubber composition yielded in each of Examples and Comparative Examples was vulcanized at 150° C. for 30 minutes to produce a vulcanized rubber. The resultant vulcanized rubber was evaluated as described below. The evaluation results are shown in Table 3.

<Evaluation of Exothermicity>

About the evaluation of the exothermicity of each of Examples, in accordance with JIS K6394, a viscoelasticity tester manufactured by Toyo Seiki Seisaku-sho, Ltd. was used to measure the loss coefficient tan δ under conditions of a static strain (initial strain) of 10%, a dynamic strain of 1%, a frequency of 10 Hz, and a temperature of 60° C. The value in Example 1 was represented by an index relative to the value regarded as 100 in Comparative Example 1; the value in Example 2 was represented by an index relative to the value regarded as 100 in Comparative Example 2; the value in Comparative Example 9 was represented by an index relative to the value regarded as 100 in Comparative Example 3; the value in Comparative Example 10 was represented by an index relative to the value regarded as 100 in Comparative Example 4; the value in Comparative Example 11 was represented by an index relative to the value regarded as 100 in Comparative Example 5; the value in Comparative Example 12 was represented by an index relative to the value regarded as 100 in Comparative Example 6; the value in Comparative Example 13 was represented by an index relative to the value regarded as 100 in Comparative Example 7; the value in Comparative Example 14 was represented by an index relative to the value regarded as 100 in Comparative Example 8; the value in Example 3 was represented by an index relative to the value regarded as 100 in Comparative Example 15; and the value in Example 4 was represented by an index relative to the value regarded as 100 in Comparative Example 16. It is demonstrated that, as Examples have a smaller index, Examples are less likely to generate heat to have excellent low exothermicity, thereby providing excellent low fuel consumption performance for tires.

<Evaluation of Abrasion Resistance>

About the evaluation of the abrasion resistance, in accordance with JIS K6264, a Lambourn abrasion tester manufactured by Iwamoto Seisakusho Co., Ltd. was used to measure the abrasion loss of a test piece of the resultant vulcanized rubber in each of Examples at a load of 29.4 N, a slip percentage of 20%, a temperature of 23° C., and a dropped sand amount of 20 g/minute. The inverse number of the abrasion loss in Example 1 was represented by an index relative to the value regarded as 100 in Comparative Example 1; the inverse number of the abrasion loss in Example 2 was represented by an index relative to the value regarded as 100 in Comparative Example 2; the inverse number of the abrasion loss in Comparative Example 9 was represented by an index relative to the value regarded as 100 in Comparative Example 3; the inverse number of the abrasion loss in Comparative Example 10 was represented by an index relative to the value regarded as 100 in Comparative Example 4; the inverse number of the abrasion loss in Comparative Example 11 was represented by an index relative to the value regarded as 100 in Comparative Example 5; the inverse number of the abrasion loss in Comparative Example 12 was represented by an index relative to the value regarded as 100 in Comparative Example 6; the inverse number of the abrasion loss in Comparative Example 13 was represented by an index relative to the value regarded as 100 in Comparative Example 7; the inverse number of the abrasion loss in Comparative Example 14 was represented by an index relative to the value regarded as 100 in Comparative Example 8; the inverse number of the abrasion loss in Example 3 was represented by an index relative to the value regarded as 100 in Comparative Example 15; and the inverse number of the abrasion loss in Example 4 was represented by an index relative to the value regarded as 100 in Comparative Example 16. It is demonstrated that, as Examples have a larger index, Examples have a smaller abrasion loss to have excellent abrasion resistance.

TABLE 3

| | | Comparative Example 1 | Example 1 | Comparative Example 2 | Example 2 | Comparative Example 3 | Comparative Example 9 | Comparative Example 4 | Comparative Example 10 |
|---|---|---|---|---|---|---|---|---|---|
| Steps (I) to (III) | Natural rubber latex (solid content) | | 100 | | 100 | | 100 | | 100 |
| | Carbon black 1 | | 45 | | | | | | |
| | Carbon black 2 | | | | 45 | | | | |
| | Carbon black A | | | | | | 45 | | |
| | Carbon black B | | | | | | | | 45 |
| | Carbon black C | | | | | | | | |
| | Carbon black D | | | | | | | | |
| | Carbon black E | | | | | | | | |
| | Carbon black F | | | | | | | | |
| Step (IV) | Natural rubber | 100 | | 100 | | 100 | | 100 | |
| | Carbon black 1 | 45 | | | | | | | |
| | Carbon black 2 | | | 45 | | | | | |
| | Carbon black A | | | | | 45 | | | |
| | Carbon black B | | | | | | | 45 | |
| | Carbon black C | | | | | | | | |
| | Carbon black D | | | | | | | | |
| | Carbon black E | | | | | | | | |
| | Carbon black F | | | | | | | | |
| | Zinc oxide | 3 | 3 | 3 | 3 | 3 | 3 | 3 | 3 |
| | Stearic acid | 2 | 2 | 2 | 2 | 2 | 2 | 2 | 2 |
| | Antiaging agent (A) | 2 | 2 | 2 | 2 | 2 | 2 | 2 | 2 |

TABLE 3-continued

| | | Comparative Example 1 | Example 1 | Comparative Example 2 | Example 2 | Comparative Example 3 | Comparative Example 9 | Comparative Example 4 | Comparative Example 10 |
|---|---|---|---|---|---|---|---|---|---|
| | Antiaging agent (B) | 1 | 1 | 1 | 1 | 1 | 1 | 1 | 1 |
| | Sulfur | 2 | 2 | 2 | 2 | 2 | 2 | 2 | 2 |
| | Vulcanization promoter (A) | 1.5 | 1.5 | 1.5 | 1.5 | 1.5 | 1.5 | 1.5 | 1.5 |
| | Vulcanization promoter (B) | 0.5 | 0.5 | 0.5 | 0.5 | 0.5 | 0.5 | 0.5 | 0.5 |
| Evaluation | Exothermicity | 100 | 81 | 100 | 86 | 100 | 87 | 100 | 99 |
| | Abrasion resistance | 100 | 103 | 100 | 103 | 100 | 103 | 100 | 107 |

| | | Comparative Example 5 | Comparative Example 11 | Comparative Example 6 | Comparative Example 12 | Comparative Example 7 | Comparative Example 13 | Comparative Example 8 | Comparative Example 14 |
|---|---|---|---|---|---|---|---|---|---|
| Steps (I) to (III) | Natural rubber latex (solid content) | | 100 | | 100 | | 100 | | 100 |
| | Carbon black 1 | | | | | | | | |
| | Carbon black 2 | | | | | | | | |
| | Carbon black A | | | | | | | | |
| | Carbon black B | | | | | | | | |
| | Carbon black C | 45 | | | | | | | |
| | Carbon black D | | | 45 | | | | | |
| | Carbon black E | | | | | 45 | | | |
| | Carbon black F | | | | | | | 45 | |
| Step (IV) | Natural rubber | 100 | | 100 | | 100 | | 100 | |
| | Carbon black 1 | | | | | | | | |
| | Carbon black 2 | | | | | | | | |
| | Carbon black A | | | | | | | | |
| | Carbon black B | | | | | | | | |
| | Carbon black C | | 45 | | | | | | |
| | Carbon black D | | | | 45 | | | | |
| | Carbon black E | | | | | | 45 | | |
| | Carbon black F | | | | | | | | 45 |
| | Zinc oxide | 3 | 3 | 3 | 3 | 3 | 3 | 3 | 3 |
| | Stearic acid | 2 | 2 | 2 | 2 | 2 | 2 | 2 | 2 |
| | Antiaging agent (A) | 2 | 2 | 2 | 2 | 2 | 2 | 2 | 2 |
| | Antiaging agent (B) | 1 | 1 | 1 | 1 | 1 | 1 | 1 | 1 |
| | Sulfur | 2 | 2 | 2 | 2 | 2 | 2 | 2 | 2 |
| | Vulcanization promoter (A) | 1.5 | 1.5 | 1.5 | 1.5 | 1.5 | 1.5 | 1.5 | 1.5 |
| | Vulcanization promoter (B) | 0.5 | 0.5 | 0.5 | 0.5 | 0.5 | 0.5 | 0.5 | 0.5 |
| Evaluation | Exothermicity | 100 | 98 | 100 | 98 | 100 | 82 | 100 | 89 |
| | Abrasion resistance | 100 | 101 | 100 | 101 | 100 | 100 | 100 | 100 |

TABLE 4

| | | Comparative Example 15 | Example 3 | Comparative Example 16 | Example 4 |
|---|---|---|---|---|---|
| Steps (I) to (III) | Natural rubber latex (solid content) | 100 | 100 | 100 | 100 |
| | Carbon black 1 | | 45 | | 45 |
| | Carbon black 2 | | | | |
| | Carbon black A | 45 | | | |
| | Carbon black B | | | 45 | |
| | Carbon black C | | | | |
| | Carbon black D | | | | |
| | Carbon black E | | | | |
| | Carbon black F | | | | |
| Step (IV) | Natural rubber | | | | |
| | Carbon black 1 | | | | |
| | Carbon black 2 | | | | |
| | Carbon black A | | | | |
| | Carbon black B | | | | |
| | Carbon black C | | | | |
| | Carbon black D | | | | |

TABLE 4-continued

|  |  | Comparative Example 15 | Example 3 | Comparative Example 16 | Example 4 |
|---|---|---|---|---|---|
|  | Carbon black E |  |  |  |  |
|  | Carbon black F |  |  |  |  |
|  | Zinc oxide | 3 | 3 | 3 | 3 |
|  | Stearic acid | 2 | 2 | 2 | 2 |
|  | Antiaging agent (A) | 2 | 2 | 2 | 2 |
|  | Antiaging agent (B) | 1 | 1 | 1 | 1 |
|  | Sulfur | 2 | 2 | 2 | 2 |
|  | Vulcanization promoter (A) | 1.5 | 1.5 | 1.5 | 1.5 |
|  | Vulcanization promoter (B) | 0.5 | 0.5 | 0.5 | 0.5 |
| Evaluation | Exothermicity | 100 | 85 | 100 | 90 |
|  | Abrasion resistance | 100 | 104 | 100 | 105 |

DESCRIPTION OF REFERENCE SIGNS

A fuel combustion zone
B combustion burner
C oxygen-containing gas inlet
D raw material introduction nozzle
E raw hydrocarbon introduction zone
F reaction zone
G coolant introduction nozzle
H flue

The invention claimed is:

1. A method for producing a rubber wet masterbatch which is yielded using at least carbon black, a dispersing solvent, and a rubber latex solution as raw materials,
the method comprising:
a step (I) of producing a carbon black-containing rubber latex solution by mixing the carbon black, the dispersing solvent, and the rubber latex solution;
a step (II) of producing a carbon black-containing rubber coagulated product by coagulating the resultant carbon black-containing rubber latex solution; and
a step (III) of producing a rubber wet masterbatch by dehydrating and drying the resultant carbon black-containing rubber coagulated product,
wherein the carbon black satisfies conditions in which:
a dibutyl phthalate oil absorption is 105 mL/100 g or more and 230 mL/100 g or less;
a statistical thickness specific surface area is 90 m$^2$/g or more and 205 m$^2$/g or less; and
a value obtained by subtracting a value of the statistical thickness specific surface area from a value of the dibutyl phthalate oil absorption is 25 or more.

2. The method according to claim 1, wherein an amount of the carbon black is 20 to 60 parts by weight based on 100 parts by weight of a rubber component in the rubber wet masterbatch.

3. A method for producing a rubber composition, comprising a step (IV) of using the rubber wet masterbatch yielded by the method according to claim 1 to attain dry-mixing.

4. The method according to claim 1, wherein the dibutyl phthalate oil absorption is 125 mL/100 g or more and 230 mL/100 g or less.

* * * * *